Feb. 5, 1935.  F. W. BALL  1,989,841
DISH RACK
Filed July 21, 1934
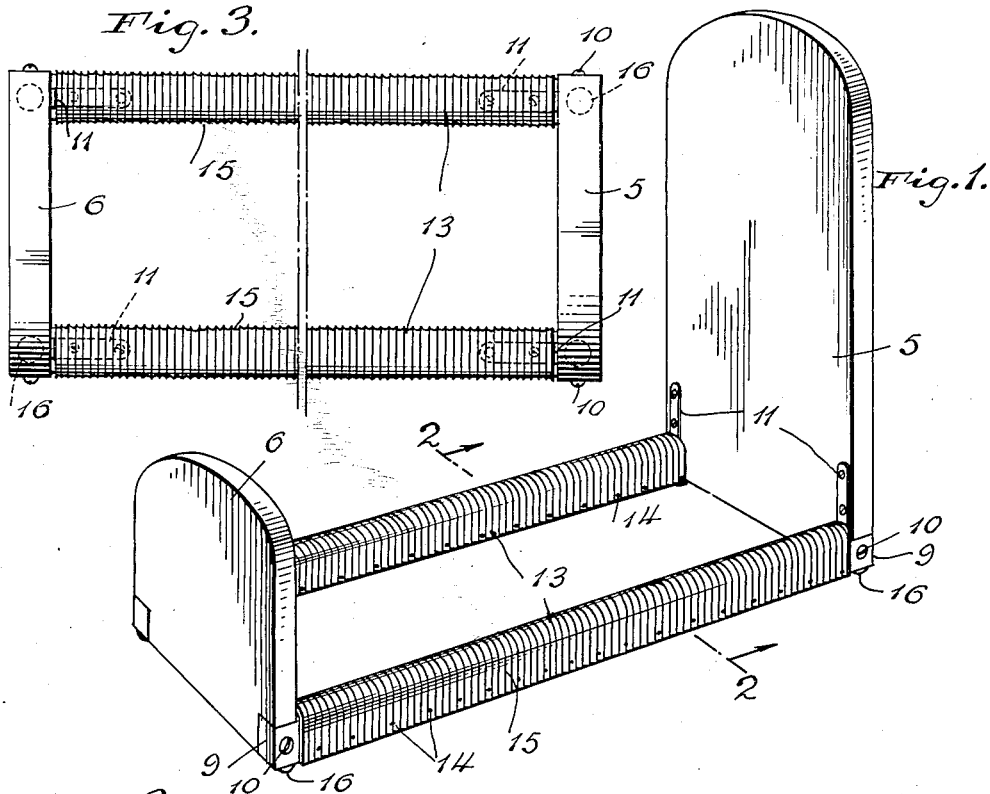
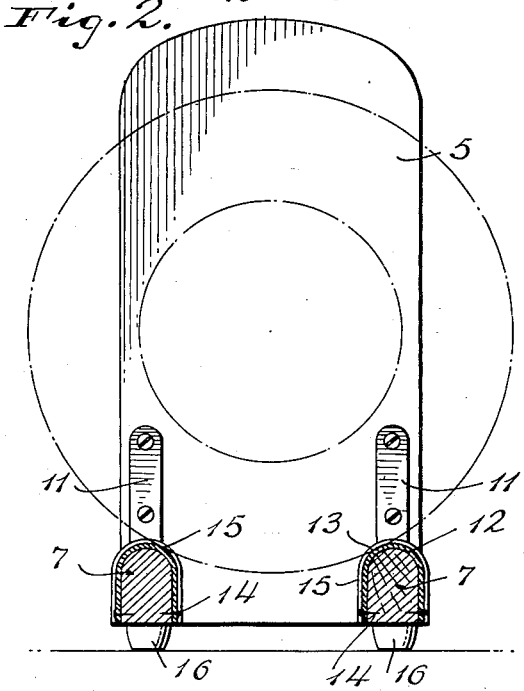
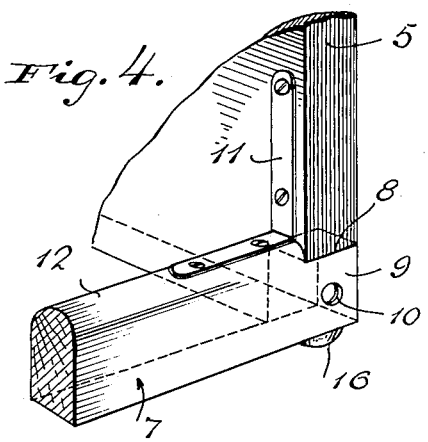
INVENTOR.
FREDERIC W. BALL
BY
ATTORNEYS Patented Feb. 5, 1935

1,989,841

UNITED STATES PATENT OFFICE 1,989,841

DISH RACK

Frederic W. Ball, Mount Vernon, N. Y.

Application July 21, 1934, Serial No. 736,313

1 Claim. (Cl. 141—9)

This invention relates to improvements in the culinary art and has particular reference to a dish rack.

An object of the invention is to provide an improved dish rack of simple and practical construction which is capable of being placed upon a drain board or in a sink and upon which dishes and the like may be supported in a substantially vertical position and adequately protected against breaking or chipping while being rinsed and cleaned preparatory to drying.

The above and other objects will appear more clearly from the following detailed description when taken in connection with the accompanying drawing which illustrates a preferred embodiment of the inventive idea.

In the drawing:

Figure 1 is a perspective view of the dish rack constructed in accordance with the invention.

Figure 2 is a section on the line 2—2 of Figure 1.

Figure 3 is a top plan view, and

Figure 4 is a fragmentary perspective view illustrating the manner in which the supporting bars are connected to the end members of the device, the protective coverings of the bars being removed.

The device of the present invention is particularly adapted for use in sinks and on drain boards when rinsing dishes and like articles which are supported thereon in such manner that a thorough draining of the rinsing water will be effected. The device, as shown, comprises two end members or uprights 5 and 6 preferably of different heights, the member 5 acting as a support for the dishes to maintain the same in a substantially vertical position, while the member 6, of lesser height, acts as a stop for the dishes when the rack is full.

The end members 5 and 6 are joined together at their lower ends by the spaced supporting bars 7 disposed in parallel relation and adapted to have the rims of dishes and the like placed thereon, the space between said bars permitting of the easy draining of the rinsing water from said dishes. Each end of each bar 7 is joined to the adjacent end member by cutting away the lower corner of the latter as indicated at 8 to form a recess for receiving the reduced end 9 of the bar. The latter is then secured to the end member by a screw 10 and an angle brace 11 one leg of which is attached to the end member by suitable fasteners while the other leg is secured along the upper edge of the bar.

The upper surface of each bar 7 is rounded as indicated at 12 to better adapt it to receive a flexible covering 13 preferably made of rubber and in the form of an elongated strip of sufficient width to be laid over the bar and extend downwardly along the sides thereof with the edges of said strip secured to the bar by means of suitable fasteners 14. The covering 13 is preferably provided with transverse corrugations 15 the grooves of which are of sufficient width to receive the rim of a dish so as to prevent the latter from inadvertently sliding along the bars when it is supported in the rack.

The lower edges of the end members 5 and 6 may be provided with rubber feet 16 so as to support the rack above the surface upon which it is placed to thereby permit the drainage from the dishes to readily flow beneath the rack.

What is claimed is:

A dish rack comprising a pair of end members each having its lower corners formed with recesses, spaced dish-supporting bars rigidly secured to said end members and having adjacent ends disposed in said recesses and further having their upper surfaces rounded, securing elements attached to said end members and bars for rigidly fastening the same together, a covering for each of said bars, said covering being formed from an elongated flat strip of soft material having transverse corrugations on its outer face and being laid over the rounded upper surface of its bar with the corrugations outermost and the sides of said strip extending along the sides of the bar, and fasteners extending through said sides for removably attaching the strip to its bar.

FREDERIC W. BALL.